United States Patent Office 2,804,444
Patented Aug. 27, 1957

2,804,444

COLOR STABILIZATION OF ACRYLONITRILE POLYMERS

Nicholas R. Segro, Greenwich, and James A. Melchore, Darien, Conn., assignors to American Cyanamid Company, New York, N. Y., a corporation of Maine No Drawing. Application May 18, 1953, Serial No. 355,844

22 Claims. (Cl. 260—45.7)

This invention relates to the stabilization of polymers of acrylonitrile and its derivatives. More particularly this invention relates to the color stabilization of polymers containing at least 10% acrylonitrile and its derivatives and correspondingly 90% of another polymerizable compound polymerized therewith.

Polymers containing acrylonitrile and its derivatives are desired due to the fact that acrylonitrile imparts to said polymers increased heat resistance, chemical resistance, abrasion resistance and flexural strength. However, when heated to elevated temperatures, the acrylonitrile and its derivatives present in the polymer has a tendency to discolor the normally water-clear polymer.

It is therefore an object of this invention to color stabilize polymers containing acrylonitrile and its derivatives. It is a further object of this invention to add to the polymeric material a small amount of a color stabilizer. These and other objects of my invention will be discussed more fully hereinbelow.

The polymers that may be stabilized in accordance with my invention include copolymers and/or interpolymers of acrylonitrile and its derivatives with another polymerizable compound containing a polymerizable $CH_2=C<$ grouping. The acrylonitrile derivatives included in the definition of my process are the alkyl substituted compounds wherein the alkyl group contains 1 to 4 carbon atoms. Examples of such compounds are methacrylonitrile, ethacrylonitrile, propacrylonitrile, butacrylonitrile, and the like. Included within the process definition as polymerizable compounds which may be polymerized with the acrylonitrile and its derivatives and rendered color-stabilized are those containing one $CH_2=C<$ grouping and having a boiling point of at least 60° C. Examples of such compounds are styrene, nuclear-substituted alkyl styrenes, e. g., o-, m-, and p-methyl styrene, 2,4-dimethyl styrene, 2,4-diethyl styrene and the like; nuclear-substituted halo styrenes, e. g., 2,4-dichlorostyrene, 2,5-dichlorostyrene, chlorostyrene, and the like; the sidechain alkyl and halo substituted styrenes, e. g., 2-chlorostyrene, 2-methylstyrene and the like. Vinyl compounds that may be mentioned are acrylic acid, allyl chloride, methallyl alcohol, methyl vinyl ketone, propyl vinyl ketone, phenyl vinyl ketone, allyl ether, and the like. Also included in the process definition are alkyl esters of acrylic and methacrylic acids, e. g., ethyl acrylate, methyl methacrylate and the like; esters of unsaturated alcohols with saturated acids, e. g., vinyl acetate, vinyl propionate, vinyl stearate and the like. It is to be understood that the polymers may be copolymers and/or interpolymers containing mixtures of acrylonitrile and its derivatives with polymerizable compounds set forth above. The preferred amount of acrylonitrile and its derivatives present in the polymers may vary from 10% to 70% by weight.

The color stabilization of the polymeric materials of our invention is effected by the addition to said materials of a small amount of a color stabilizer selected from the group consisting of a compound represented by the general Formula 1

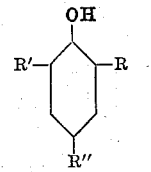

wherein R, R' and R" represent alkyl radicals, at least one of which contains 3 carbon atoms and is in a position ortho to the OH group; a compound represented by the general Formula 2

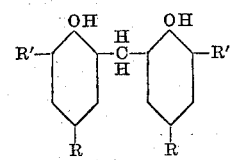

wherein R represents a n-alkyl radical containing from 1 to 3 carbon atoms and R' represents a tertiary alkyl radical containing from 4 to 8 carbon atoms; a compound represented by the general Formula 3

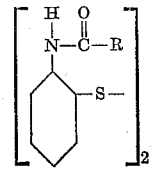

wherein R is selected from the group consitsing of alkyl radicals containing from 2 to 12 carbon atoms and aryl radicals containing from 6 to 12 carbon atoms; a compound represented by the general Formula 4 R—SH wherein R represents an aryl radical containing from 6 to 12 carbon atoms; and a compound selected from the group consisting of (5)

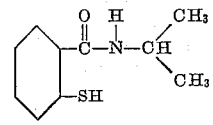

and the organic amine and the zinc salts thereof. Representative compounds which may be disclosed as represented by the general Formula 1 are 2-isopropyl-4,6-dimethyl phenol, 2-tertiary amyl-4,6-dimethyl phenol, 2-methyl-2,6-diisopropyl phenol, 2,6-ditertiary butyl paracresol, 2,6-ditertiary amyl para-cresol, 2,6-ditertiary butyl-4-tertiary amyl phenol, 2,4,6-triisopropyl phenol, 2,4,6-tritertiary butyl phenol, 2,4,6-tritertiary amyl phenol, and the like. It will be seen that the alkyl groups represented by R, R' and R" contain from 1 to 5 carbon atoms. The compounds represented by the general Formula 2 above are such as 2,2'-methylenebis (4-methyl - 6 - tertiary - butylphenol), 2,2'-methylenebis (4-ethyl - 6 - tertiary - butylphenol), 2,2'-methylenebis (4-propyl-6-tertiary-octylphenol), etc. General Formula 3 discloses those compounds where R may be a methyl, ethyl, butyl, cyclohexyl, octyl, lauryl, phenyl, tolyl, xylyl, naphthyl and the like radical. Examples of such compounds are o,o'-dibenzamido-diphenyl-disulfide, o,o'-dimethylamido - diphenyl-disulfide, o,o'-dioctyl-amido-diphenyl-disulfide, etc. In reference to the general Formula 4 R represents an aryl radical such as phenyl, tolyl, biphenyl, naphthyl, methyl naphthyl, and the like. Examples of such compounds are thiophenol, thio-alpha-naphthol, thio-beta-naphthol, p-mercapto-diphenyl-methane, 2:3-dimercapto-naphthalene. The color stabilizer represented by the general Formula 5 may be used per se or as one of its salts. These salts include both the organic amine salts and salts of bi-metallic metals such as zinc. The amount of the color stabilizer that may be added to the polymeric material to effect the desired results may vary from about 0.001% to about 5% by weight based on the total weight of said material. It is preferred, however, that from about 0.05% to about 0.1% be added.

The color stabilizer may be incorporated into the polymer in any of several methods. If desired, the stabilizer and the solid polymer may be mixed as, for example on a two roll mill or by any other suitable mixing machine adapted to blend solid plastic material. Alternatively, the stabilizer may be added to the monomers in the polymerization recipe when the polymerization is carried out as, for instance, in an aqueous emulsion. Any method that permits a uniform distribution of the color stabilizer throughout the polymer may also find use in my invention.

The polymers that have been color stabilized according to my invention may find use in the preparation of films, molded or extruded objects wherein a transparent or light-colored article is desired.

In order that those skilled in the art may more fully understand the inventive concept herein employed, the following table is set forth disclosing a polymer in accordance with my invention:

| Polymer, Weight Ratio | Stabilizer | Amount, Percent Based on Polymer | Color Rating [3] | |
|---|---|---|---|---|
| | | | As Polymerized | After 1 hr. at 190° C. in Air |
| 70/30 S/AN [1] | none | | 2 | 8 |
| 70/30 DMS/AN [2] | do | | 4 | 10 |
| 70/30 S/AN | Thio-beta-naphthol | 0.10 | 2 | 2-3 |
| 70/30 S/AN | do | 0.02 | 1 | 4 |
| 70/30 S/AN | do | 0.30 | 2 | 6 |
| 70/30 S/AN | do | 1.0 | 1 | 5 |
| 70/30 DMS/AN | do | 0.10 | 3 | 9 |
| 70/30 S/AN | 2,6-Ditertiary-butyl paracresol | 0.10 | 1 | 2-3 |
| 70/30 S/AN | do | 0.02 | 1 | 6 |
| 70/30 S/AN | do | 0.30 | 2 | 5 |
| 70/30 S/AN | do | 1.0 | 1 | 6 |
| 70/30 DMS/AN | do | 1.0 | 2 | 8 |
| 70/30 S/AN | Thiosalicyl Isopropylamine | 0.10 | 2 | 3 |
| 70/30 S/AN | do | 0.02 | 1 | 6 |
| 70/30 S/AN | do | 0.30 | 2 | 6 |
| 70/30 DMS/AN | do | 0.10 | 2 | 8 |
| 70/30 S/AN | 0,0'-Dibenzamido diphenyl disulfide | 0.10 | 1 | 3 |
| 70/30 S/AN | do | 0.02 | 1 | 6 |
| 70/30 S/AN | do | 0.3 | 1 | 7 |
| 70/30 S/AN | 2,2'-Methylenebis (4-methyl-6-tertiarybutyl phenol) | 0.10 | 1 | 4 |
| 70/30 S/AN | do | 0.01 | 2 | 7 |
| 70/30 S/AN | do | 0.05 | 1 | 6 |
| 70/30 S/AN | do | 0.50 | 4 | 7 |
| 70/30 DMS/AN | do | 0.10 | 3 | 6 |

[1] Styrene/acrylonitrile.
[2] Dimethyl styrene/acrylonitrile.
[3] Color rating.
1—Water white.
4—Very light yellow.
7—Light yellow.
10—Amber.
14—Black.

We claim:

1. A resinous composition having increased color stability to heat which comprises the polymerization product of from about 10% to about 70% by weight of a compound selected from the group consisting of acrylonitrile and alkyl substituted acrylonitrile wherein the alkyl group contains from 1 to 4 carbon atoms and from about 90% to about 30% by weight of a compound selected from the group consisting of styrene, nuclear substituted methylstyrene, nuclear substituted dimethylstyrene, nuclear substituted ethylstyrene, nuclear substituted diethylstyrene and mono- and di-chlorostyrene, and dispersed therein from about 0.005% to about 5% by weight based on the total weight of a color stabilizer selected from the group consisting of a compound represented by the general formula

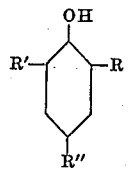

wherein R, R' and R'' represent alkyl radicals, at least one of which contains 3 carbon atoms and is in a position ortho to the OH group; a compound represented by the general formula

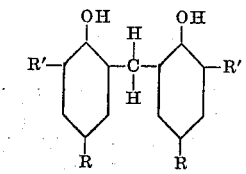

wherein R represents a n-alkyl radical containing from 1 to 3 carbon atoms and R' represents a tertiary alkyl radical containing from 4 to 8 carbon atoms; a compound represented by the general formula

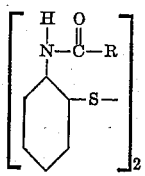

wherein R is selected from the group consisting of alkyl radicals containing from 2 to 12 carbon atoms and aryl radicals containing from 6 to 12 carbon atoms; a compound represented by the general formula R—SH wherein R represents an aryl radical containing from 6 to 12 carbon atoms; and a compound selected from the group consisting of

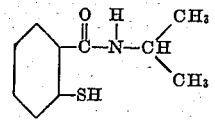

and the organic amine and the zinc salts thereof.

2. A resinous composition having increased color stability to heat which comprises the polymerization product of from about 10% to about 70% by weight of a compound selected from the group consisting of acrylonitrile and alkyl substituted acrylonitrile wherein the alkyl group contains from 1 to 4 carbon atoms and from about 90% to about 30% by weight of a compound selected from the group consisting of styrene, nuclear substituted methylstyrene, nuclear substituted dimethylstyrene, nuclear substituted ethylstyrene, nuclear substituted diethylstyrene and mono- and di-chlorostyrene, and dispersed therein from about 0.005% to about 5% by weight based on the total weight of a color stabilizer represented by the general formula

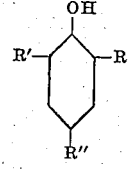

wherein R, R' and R'' represent alkyl radicals, at least one of which contains 3 carbon atoms and is in a position ortho to the OH group.

3. A resinous composition having increased color stability to heat which comprises the polymerization product of from about 10% to about 70% by weight of a compound selected from the group consisting of acrylonitrile and alkyl substituted acrylonitrile wherein the alkyl group contains from 1 to 4 carbon atoms and from about 90% to about 30% by weight of a compound selected from the group consisting of styrene, nuclear substituted methylstyrene, nuclear substituted dimethylstyrene, nuclear substituted ethylstyrene, nuclear substituted diethylstyrene and mono- and di-chlorostyrene, and dispersed therein from about 0.005% to about 5% by weight based on the total weight of a color stabilizer represented by the general formula

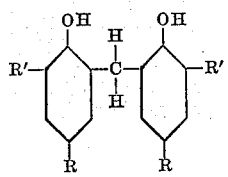

wherein R represents a n-alkyl radical containing from 1 to 3 carbon atoms and R' represents a tertiary alkyl radical containing from 4 to 8 carbon atoms.

4. A resinous composition having increased color stability to heat which comprises the polymerization product of from about 10% to about 70% by weight of a compound selected from the group consisting of acrylonitrile and alkyl substituted acrylonitrile wherein the alkyl group contains from 1 to 4 carbon atoms and from about 90% to about 30% by weight of a compound selected from the group consisting of styrene, nuclear substituted methylstyrene, nuclear substituted dimethylstyrene, nuclear substituted ethylstyrene, nuclear substituted diethylstyrene and mono- and di-chlorostyrene, and dispersed therein from about 0.005% to about 5% by weight based on the total weight of a color stabilizer represented by the general formula

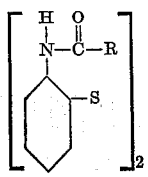

wherein R is selected from the group consisting of alkyl radicals containing from 2 to 12 carbon atoms and aryl radicals containing from 6 to 12 carbon atoms.

5. A resinous composition having increased color stability to heat which comprises the polymerization product of from about 10% to about 70% by weight of a compound selected from the group consisting of acrylonitrile and alkyl substituted acrylonitrile wherein the alkyl group contains from 1 to 4 carbon atoms and from about 90% to about 30% by weight of a compound selected from the group consisting of styrene, nuclear substituted methylstyrene, nuclear substituted dimethylstyrene, nuclear substituted ethylstyrene, nuclear substituted diethylstyrene and mono- and di-chlorostyrene, and dispersed therein from about 0.005% to about 5% by weight based on the total weight of a color stabilizer represented by the general formula R—SH wherein R represents an aryl radical containing from 6 to 12 carbon atoms.

6. A resinous composition having increased color stability to heat which comprises the polymerization product of from about 10% to about 70% by weight of a compound selected from the group consisting of acrylonitrile and alkyl substituted acrylonitrile wherein the alkyl group contains from 1 to 4 carbon atoms and from about 90% to about 30% by weight of a compound selected from the group consisting of styrene, nuclear substituted methylstyrene, nuclear substituted dimethylstyrene, nuclear substituted ethylstyrene, nuclear substituted diethylstyrene and mono- and di-chlorostyrene, and dispersed therein from about 0.005% to about 5% by weight based on the total weight of a color stabilizer represented by the formula

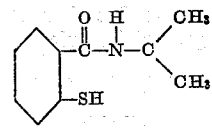

7. A resinous composition having increased color stability to heat which comprises the polymerization product of from about 10% to about 70% by weight of a compound selected from the group consisting of acrylonitrile and alkyl substituted acrylonitrile wherein the alkyl group contains from 1 to 4 carbon atoms and from about 90% to about 30% by weight of a compound selected from the group consisting of styrene, nuclear substituted methylstyrene, nuclear substituted dimethylstyrene, nuclear substituted ethylstyrene, nuclear substituted diethylstyrene and mono- and di-chlorostyrene, and dispersed therein from about 0.005% to about 5% by weight based on the total weight of a color stabilizer being the organic amine salt of a compound represented by the formula

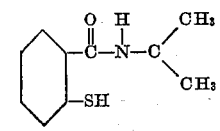

8. A resinous composition having increased color stability to heat which comprises the polymerization product of from about 10% to about 70% by weight of a compound selected from the group consisting of acrylonitrile and alkyl substituted acrylonitrile wherein the alkyl group contains from 1 to 4 carbon atoms and from about 90% to about 30% by weight of a compound selected from the group consisting of styrene, nuclear substituted methylstyrene nuclear substituted dimethylstyrene, nuclear substituted ethylstyrene, nuclear substituted diethylstyrene and mono- and di-chlorostyrene, and dispersed therein from about 0.005% to about 5% by weight based on the total weight of a color stabilizer being the zinc salt of a compound represented by the formula

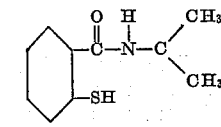

9. A resinous composition having increased color stability to heat which comprises the polymerization product of from about 10% to about 70% by weight of acrylonitrile and alkyl substituted acrylonitrile wherein the alkyl group contains from 1 to 4 carbon atoms and from about 90% to about 30% of styrene, and dispersed therein from about 0.005% to about 5% by weight based on the total weight of a color stabilizer selected from the group consisting of a compound represented by the general formula

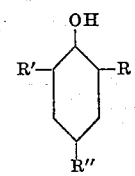

wherein R, and R' and R'' represent alkyl radicals, at least one of which contains 3 carbon atoms and is in a position ortho to the OH group; a compound represented by the general formula

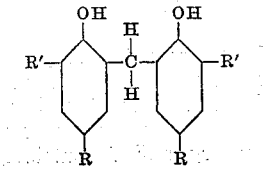

wherein R represents a n-alkyl radical containing from 1 to 3 carbon atoms and R' represents a tertiary alkyl radical containing from 4 to 8 carbon atoms; a compound represented by the general formula

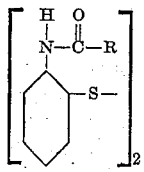

wherein R is selected from the group consisting of alkyl radicals containing from 2 to 12 carbon atoms and aryl radicals containing from 6 to 12 carbon atoms; a compound represented by the general formula R—SH wherein R represents an aryl radical containing from 6 to 12 carbon atoms; and a compound selected from the group consisting of

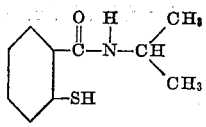

and the organic amine and the zinc salts thereof.

10. A resinous composition having increased color stability to heat which comprises the polymerization product of from about 10% to about 70% by weight of acrylonitrile and from about 90% to about 30% of styrene, and dispersed therein from about 0.005% to about 5% by weight based on the total weight of a color stabilizer selected from the group consisting of a compound represented by the general formula

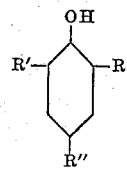

wherein R, R' and R" represent alkyl radicals, at least one of which contains 3 carbon atoms and is in a position ortho to the OH group; a compound represented by the general formula

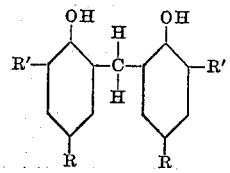

wherein R represents a n-alkyl radical containing from 1 to 3 carbon atoms and R' represents a tertiary alkyl radical containing from 4 to 8 carbon atoms; a compound represented by the general formula

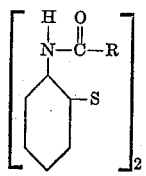

wherein R is selected from the group consisting of alkyl radicals containing from 2 to 12 carbon atoms and aryl radicals containing from 6 to 12 carbon atoms; a compound represented by the general formula R—SH wherein R represents an aryl radical containing from 6 to 12 carbon atoms; and a compound selected from the group consisting of

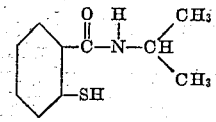

and the organic amine and the zinc salts thereof.

11. A resinous composition having increased color stability to heat which comprises the polymerization product of from about 10% to about 70% by weight of acrylonitrile and from about 90% to about 30% of styrene, and dispersed therein from about 0.005% to about 5% by weight based on the total weight of a color stabilizer represented by the general formula

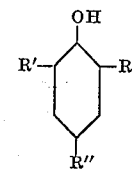

wherein R, R' and R" represent alkyl radicals, at least one of which contains 3 carbon atoms and is in a position ortho to the OH group.

12. A resinous composition having increased color stability to heat which comprises the polymerization product of from about 10% to about 70% by weight of acrylonitrile and from about 90% to about 30% of styrene, and dispersed therein from about 0.005% to about 5% by weight based on the total weight of a color stabilizer represented by the general formula

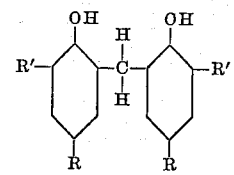

wherein R represents a n-alkyl radical containing from 1 to 3 carbon atoms and R' represents a tertiary alkyl radical containing from 4 to 8 carbon atoms.

13. A resinous composition having increased color stability to heat which comprises the polymerization product of from about 10% to about 70% by weight of acrylonitrile and from about 90% to about 30% of styrene, and dispersed therein from about 0.005% to about 5% by weight based on the total weight of a color stabilizer represented by the general formula

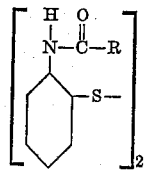

wherein R is selected from the group consisting of alkyl radicals containing from 2 to 12 carbon atoms and aryl radicals containing from 6 to 12 carbon atoms.

14. A resinous composition having increased color stability to heat which comprises the polymerization product of from about 10% to about 70% by weight of acrylonitrile and from about 90% to about 30% of styrene, and dispersed therein from about 0.005% to about 5% by weight based on the total weight of a color stabilizer represented by the general formula R—SH wherein R represents an aryl radical containing from 6 to 12 carbon atoms.

15. A resinous composition having increased color stability to heat which comprises the polymerization product of from about 10% to about 70% by weight of acrylonitrile and from about 90% to about 30% styrene, and dispersed therein from about 0.005% to about 5% by weight based on the total weight of a color stabilizer represented by the formula

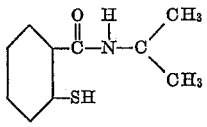

16. A resinous composition having increased color stability to heat which comprises the polymerization product of from about 10% to about 70% by weight of acrylonitrile and from about 90% to about 30% of styrene, and dispersed therein from about 0.005% to about 5% by weight based on the total weight of a color stabilizer being the organic amine salt of a compound represented by the general formula

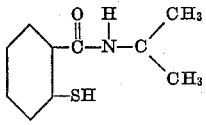

17. A resinous composition having increased color stability to heat which comprises the polymerization product of from about 10% to about 70% by weight of acrylonitrile and from about 90% to about 30% of styrene, and dispersed therein from about 0.005% to about 5% by weight based on the total weight of a color stabilizer being the zinc salt of a compound represented by the general formula

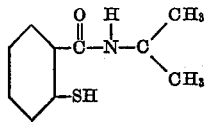

18. A resinous composition having increased color stability to heat which comprises the polymerization product of from about 10% to about 70% by weight of acrylonitrile and from about 90% to about 30% of styrene, and dispersed therein from about 0.005% to about 5% by weight based on the total weight of 2,6-ditertiarybutylparacresol.

19. A resinous composition having increased color stability to heat which comprises the polymerization product of from about 10% to about 70% by weight of acrylonitrile and from about 90% to about 30% of styrene, and dispersed therein from about 0.005% to about 5% by weight based on the total weight of 2,2'-methylenebis (4-methyl-6-tertiarybutyl phenol).

20. A resinous composition having increased color stability to heat which comprises the polymerization product of from about 10% to about 70% by weight of acrylonitrile and from about 90% to about 30% of styrene, and dispersed therein from about 0.005% to about 5% by weight based on the total weight of O,O'-dibenzamido diphenyl disulfide.

21. A resinous composition having increased color stability to heat which comprises the polymerization product of from about 10% to about 70% by weight of acrylonitrile and from about 90% to about 30% of styrene, and dispersed therein from about 0.005% to about 5% by weight based on the total weight of thio-beta-naphthol.

22. A resinous composition having increased color stability to heat which comprises the polymerization product of from about 10% to about 70% by weight of acrylonitrile and from about 90% to about 30% of styrene, and dispersed therein from about 0.005% to about 5% by weight based on the total weight of thio-salicyl isopropylamine.

References Cited in the file of this patent

UNITED STATES PATENTS

| | | |
|---|---|---|
| 2,160,172 | Rosen | May 30, 1939 |
| 2,471,887 | Nelson | May 31, 1949 |
| 2,538,355 | Davis et al. | Jan. 16, 1951 |
| 2,550,139 | Daly | Apr. 24, 1951 |
| 2,700,025 | Cothran | Jan. 18, 1955 |